US011643017B2

(12) United States Patent
Grammatikos

(10) Patent No.: US 11,643,017 B2
(45) Date of Patent: May 9, 2023

(54) LINKAGE ASSEMBLY FOR RETRACTABLE LADDER ARRANGEMENT

(71) Applicant: THE SMART 2011 TRUST, Sandton (ZA)

(72) Inventor: George Grammatikos, Sandton (ZA)

(*) Notice: Subject to any disclaimer, the term of this patent is extended or adjusted under 35 U.S.C. 154(b) by 439 days.

(21) Appl. No.: 16/356,137

(22) Filed: Mar. 18, 2019

(65) Prior Publication Data
US 2019/0210533 A1   Jul. 11, 2019

Related U.S. Application Data

(63) Continuation-in-part of application No. 15/657,952, filed on Jul. 24, 2017, now abandoned, which is a
(Continued)

(51) Int. Cl.
*E06C 5/28* (2006.01)
*B60R 3/02* (2006.01)
(Continued)

(52) U.S. Cl.
CPC .............. *B60R 3/02* (2013.01); *E06C 1/54* (2013.01); *E06C 5/28* (2013.01); *E06C 5/32* (2013.01)

(58) Field of Classification Search
CPC ..... B60R 3/02; E06C 1/54; E06C 5/28; E06C 5/32; E04F 11/066
See application file for complete search history.

(56) References Cited

U.S. PATENT DOCUMENTS 502,485 A * 8/1893 Dederick
598,544 A * 2/1898 Uri
(Continued)

FOREIGN PATENT DOCUMENTS

| DE | 912783 C | * | 6/1954 | ............ E06C 1/54 |
|---|---|---|---|---|
| DE | 2008808 A1 | * | 9/1970 | ............ E06C 1/54 |
| GB | 2150967 A | * | 7/1985 | ............ E06C 9/14 |

*Primary Examiner* — Colleen M Chavchavadze
(74) *Attorney, Agent, or Firm* — Lippes Mathias LLP

(57) ABSTRACT

A linkage assembly including first, second, third, fourth and fifth elongate linkage members 12, 14, 16, 18 and 20 respectively, a first connecting arrangement 22 for connecting and allowing pivotal displacement between proximal end regions of the first and second elongate linkage members 12 and 14 respectively, a second connecting arrangement 24 for connecting and allowing pivotal displacement between distal end regions of the first and third elongate linkage members 12 and 16 respectively, a step support connecting arrangement 26 for connecting the first and fourth elongate linkage members 12 and 18 respectively, the step support connecting arrangement 26 being located inwardly the second connecting arrangement 24 and provides a stepping formation 30 for a user, the step support connecting arrangement 26 including a shaft 32 having a first portion 34 which is shaped to be received by and inhibit relative pivotal displacement between the fourth linkage member 18 and the stepping formation 30 during extension and retraction of the retractable ladder arrangement 36 and a second portion 38 shaped to be received by and allow pivotal displacement between the first and fourth linkage members 12 and 18, and a third connecting arrangement 28 for connecting and allowing pivotal displacement between the first and fifth elongate linkage members 12 and 20 respectively, the fifth elongate linkage member 20 being located intermediate the first and step support connecting arrangements 22 and 26 respectively.

11 Claims, 18 Drawing Sheets

Related U.S. Application Data continuation-in-part of application No. PCT/ZA2016/050003, filed on Jan. 25, 2016.

(51) Int. Cl.
*E06C 5/32* (2006.01)
*E06C 1/54* (2006.01)

(56) References Cited

U.S. PATENT DOCUMENTS

| | | | | |
|---|---|---|---|---|
| 943,672 | A * | 12/1909 | Flynn | E04F 11/066 |
| | | | | 254/122 |
| 1,815,236 | A * | 7/1931 | Carlson | E06C 1/54 |
| | | | | 182/158 |
| 2,921,645 | A * | 1/1960 | Morrow | E06C 1/54 |
| | | | | 182/157 |
| 3,263,773 | A * | 8/1966 | Sallein | E06C 9/14 |
| | | | | 182/158 |
| 3,265,155 | A * | 8/1966 | Thatcher, Jr. | E06C 1/54 |
| | | | | 182/27 |
| 8,251,178 | B2 * | 8/2012 | Krobot | B60R 3/02 |
| | | | | 182/88 |
| 9,010,473 | B1 * | 4/2015 | Rasmussen | B60R 3/02 |
| | | | | 180/166 |

* cited by examiner

LINKAGE ASSEMBLY FOR RETRACTABLE LADDER ARRANGEMENT

This application is a continuation-in-part filing claiming the benefit of U.S. patent application Ser. No. 15/657,952 filed on Jul. 24, 2017, which is a continuation-in-part of PCT/ZA2016/050003 filed Jan. 25, 2016, which claims the benefit of South African Patent Application No. 2015/00494 filed Jan. 23, 2015. This application further claims the benefit of South African Patent Application No. 2018/05627 filed on Aug. 23, 2018, the disclosures of which are herein incorporated by reference.

FIELD OF THE INVENTION

This invention relates to a linkage assembly for a retractable ladder arrangement suitable for providing access to for example, a heavy-duty mining vehicle and to a retractable ladder arrangement for a heavy-duty mining vehicle or the like.

SUMMARY OF THE INVENTION

According to a first aspect of the invention there is provided a linkage assembly for a retractable ladder arrangement which includes:

a plurality of elongate linkage members;

a first connecting arrangement for connecting and allowing pivotal displacement between proximal end regions of a first linkage member and a second linkage member;

a second connecting arrangement for connecting and allowing pivotal displacement between distal end regions of the first linkage member and a third linkage member;

a step support connecting arrangement for connecting the first linkage member and a fourth linkage member inwardly the second connecting arrangement and for providing a stepping formation for a user, the step support connecting arrangement including a shaft having a first portion which is shaped to be received by and inhibit relative pivotal displacement between the fourth linkage member and the stepping formation during extension and retraction of the retractable ladder arrangement and a second portion shaped to be received by and allow pivotal displacement between the first linkage member and the fourth linkage member; and a third connecting arrangement for connecting and allowing pivotal displacement between the first linkage member and a fifth linkage member intermediate the first connecting arrangement and step support connecting arrangement.

The elongate linkage members may include receiving formations for receiving the various connecting arrangements therein. The receiving formations may be in the form of apertures defined in the linkage members. The apertures may be of any conventional geometric shape, preferably being generally circular to allow pivotal displacement between the first linkage member and the second linkage member, the first linkage member and the third linkage member, the first linkage member and the fourth linkage member, and the first linkage member and the fifth linkage member, respectively. The apertures may be of any suitable non-circular cross-sectional shape selected from the group including oval, triangular, square, rectangular, pentagonal, hexagonal, heptagonal, octagonal, and any other suitable polygonal shape, preferably being generally hexagonal, to inhibit pivotal displacement between the fourth linkage member and the step support connecting arrangement.

The first, second and third connecting arrangements may have shaft portions which may be configured to be received complementally the apertures, preferably being the generally circular apertures, defined in the respective corresponding linkage members to allow relative pivotal displacement therebetween. The connecting arrangements may include a retaining member, typically in the form of a bolt, for retaining the shafts in the corresponding apertures. The connecting arrangements may include a locating member, preferably in the form of a pin, for locating and aligning the apertures of the respective corresponding linkage members and the retaining members relative one another. The connecting arrangements may include bearing assemblies or Vesconite™ bush assemblies which may be shaped and/or configured to be arranged between the respective shafts and apertures to improve pivotal displacement between the respective linkages and corresponding shafts. The connecting arrangements may include spacers, typically in the form of washers or rings, for spacing the respective corresponding linkage members apart and to facilitate retention of the bearing assemblies Vesconite™ bush assemblies in the apertures. The connecting arrangements may include sealing members arranged within corresponding grooves or recesses in the linkage members surrounding the apertures. The sealing member may be in the form of a dust seal which may be manufactured from any suitable synthetic plastics or metallic material, preferably being nylon.

The second to fifth elongate linkage members may include a step support aperture for receiving the first portion of the shaft of the step support connecting arrangement therein and which may be configured to inhibit relative displacement between the fourth linkage member and the stepping formation. The step support aperture for receiving the step support connecting arrangement therein may be of any suitable non-circular cross-sectional shape selected from the group including oval, triangular, square, rectangular, pentagonal, hexagonal, heptagonal, octagonal, and any other suitable polygonal shape, preferably being generally hexagonal.

The first portion of the shaft of the step support connecting arrangement may be configured to be received, preferably complementally, by the step support aperture of the fourth linkage member and the second portion may be configured to be received by an aperture of the first linkage member. The first portion of the shaft may have any suitable non-circular cross-sectional shape selected from the group including oval, triangular, square, rectangular, pentagonal, hexagonal, heptagonal, octagonal, and any other suitable polygonal shape, so as to inhibit relative pivotal displacement between the fourth linkage member and the step support connecting arrangement, preferably being of hexagonal cross-section. The stepping formation may be securable to the first portion of the shaft via any suitable securing member such as a screw threaded bolt assembly.

The second portion of the shaft may be of circular cross section to permit relative pivotal displacement between the first linkage member and the stepping formation.

The step support connecting arrangement may include a retaining member for retaining the shaft in position in the apertures of the first linkage member and the fourth linkage member. The step support connecting arrangement may further include a locating member, preferably in the form of a pin, for locating and aligning the apertures of the respective linkage members relative each other. The step support connecting arrangement may include a bearing or Vesconite™ bush which may be shaped and/or configured to be arranged between the second portions of the shafts and the apertures of the first linkage member to improve pivotal displacement therebetween. The step support connecting arrangement may include a spacer element, typically in the form of a washer or ring, for spacing the first linkage member and fourth linkage member apart. The step support connecting arrangement may include sealing members arranged within corresponding grooves or recesses in the linkage members surrounding the apertures. The sealing member may be in the form of a dust seal which may be manufactured from any suitable synthetic plastics, or metallic material, preferably being nylon.

According to a second aspect of the invention there is provided a linkage assembly for a retractable ladder arrangement which includes:

a plurality of elongate linkage members;

a first connecting arrangement for connecting and allowing pivotal displacement between proximal end regions of a first linkage member and a second linkage member;

a second connecting arrangement for connecting and allowing pivotal displacement between distal end regions of the first linkage member and a third linkage member;

a first step support connecting arrangement for connecting the first linkage member and a fourth linkage member inwardly the second connecting arrangement and for providing a first stepping formation for a user;

a third connecting arrangement for connecting and allowing pivotal displacement between the first linkage member and a fifth linkage member inwardly the first step support connecting arrangement;

a second step support connecting arrangement for connecting the first linkage member and a sixth linkage member intermediate the third connecting arrangement and the first connecting arrangement and for providing a second stepping formation for a user;

wherein the step support connecting arrangements include shafts having first portions which are shaped to be received by and inhibit relative pivotal displacement between the first linkage member and the first stepping formation, and the first linkage member and the second stepping formation respectively, during the extension and retraction of the retractable ladder arrangement and second portions shaped to be received by and allow pivotal displacement between the first linkage member and the fourth linkage member and the first linkage member and the sixth linkage member respectively.

The elongate linkage members may include receiving formations for receiving the various connecting arrangements therein. The receiving formations may be in the form of apertures defined in the linkage members. The apertures may be of any conventional geometric shape, preferably being generally circular to allow pivotal displacement between the first linkage member and the second linkage member, the first linkage member and the third linkage member, the first linkage member and the fourth linkage member, the first linkage member and the fifth linkage member and the first linkage member and the sixth linkage member, respectively. The apertures may be of any suitable non-circular cross-sectional shape selected from the group including oval, triangular, square, rectangular, pentagonal, hexagonal, heptagonal, octagonal, and any other suitable polygonal shape, preferably being generally hexagonal, to inhibit pivotal displacement between the first linkage member and the first and second step support connecting arrangements.

The first, second and third connecting arrangements may have shaft portions which may be configured to be received complementally the apertures, preferably being the generally circular apertures, defined in the respective corresponding linkage members to allow relative pivotal displacement therebetween. The connecting arrangements may include a retaining member, typically in the form of a bolt, for retaining the shafts in the corresponding apertures. The connecting arrangements may include a locating member, preferably in the form of a pin, for locating and aligning the apertures of the respective corresponding linkage members and the retaining members relative one another. The connecting arrangements may include bearing assemblies or Vesconite™ bush assemblies which may be shaped and/or configured to be arranged between the respective shafts and apertures to improve pivotal displacement between the respective linkages and corresponding shafts. The connecting arrangements may include spacers, typically in the form of washers or rings, for spacing the respective corresponding linkage members apart and to facilitate retention of the bearing assemblies or Vesconite™ bush assemblies in the apertures. The connecting arrangements may include sealing members which may be arranged within corresponding grooves or recesses in the linkage members surrounding the apertures. The sealing member may be in the form of a dust seal which may be manufactured from any suitable synthetic plastics, or metallic material, preferably being nylon.

The first elongate linkage member may include a step support aperture for receiving the first portion of the shaft of the first step support connecting arrangement therein and which may be configured to inhibit relative displacement between the first linkage member and the first stepping formation. The first elongate linkage member may include a second step support aperture for receiving the first portion of the shaft of the second step support connecting arrangement therein and which may be configured to inhibit relative displacement between the first linkage member and the second stepping formation. The step support apertures for receiving the step support connecting arrangement may have a non-circular cross-section, preferably being generally hexagonal. The step support apertures for receiving the step support connecting arrangements therein may be of any suitable non-circular cross-sectional shape selected from the group including oval, triangular, square, rectangular, pentagonal, hexagonal, heptagonal, octagonal, and any other suitable polygonal shape, preferably being generally hexagonal.

The first portions of the shafts of the step support connecting arrangements may be configured to be received, preferably complementally, by the first and second step support apertures of the first linkage member, respectively, and the second portions may be configured to be received by the apertures of the fourth linkage member and sixth linkage member, respectively. The first portions of the shafts may have any suitable non-circular cross-sectional shape selected from the group including oval, triangular, square, rectangular, pentagonal, hexagonal, heptagonal, octagonal, and any other suitable polygonal shape, so as to inhibit relative pivotal displacement between the first linkage member and the step support connecting arrangements, preferably being of hexagonal cross-section. The stepping formations may be securable to the first portions of the shaft via any suitable securing member such as a screw threaded bolt assembly.

The second portions of the shafts may be of circular cross section to permit relative pivotal displacement between the fourth linkage member, sixth linkage member and the first and second stepping formations, respectively.

The first and second step support connecting arrangements may include a retaining member for retaining the shaft in position in the apertures of the first linkage member and the fourth linkage member and the first linkage member and the sixth linkage member, respectively. The step support connecting arrangements may further include a locating member, preferably in the form of a pin, for locating and aligning the apertures of the respective linkage members relative each other. The step support connecting arrangements may include a bearing or Vesconite™ bush which may be shaped and/or configured to be arranged between the second portions of the shafts and the apertures of the fourth linkage member and the sixth linkage member, respectively, to improve pivotal displacement therebetween. The step support connecting arrangements may include a spacer element, typically in the form of a washer or ring, for spacing apart the first and fourth linkage members and the first and sixth linkage members, respectively. The step support connecting arrangements may include sealing members arranged within corresponding grooves or recesses in the linkage members surrounding the apertures. The sealing member may be in the form of a dust seal which may be manufactured from any suitable synthetic plastics, or metallic material, preferably being nylon.

According to a third aspect of the invention, there is provided a retractable ladder arrangement for a vehicle, which retractable ladder arrangement includes:

a plurality of linkage assemblies as hereinbefore described which are connected in an end-to-end configuration;

a primary displacement means for displacing the linkage assemblies between a collapsed retracted condition and an extended condition;

a coupling for coupling the linkage assemblies to the primary displacement means; and a controller for controlling the primary displacement means.

The primary displacement means may be in the form of any suitable motor which may be energised by an energy source, preferably an electrical energy source, of a motor vehicle. The electrical energy source may be AC or DC. The primary displacement means may include a drive means. The drive means may be in the form of a motor and gearbox arrangement. The motor may be pneumatically or hydraulically powered. The drive means may include a coupling means for coupling the gearbox to the motor.

An auxiliary drive means may be provided for driving the gearbox in the event that the motor is not energized. The auxiliary drive means may be configured to displace the gearbox when the motor is inoperable.

The auxiliary drive means may include a pressure vessel which may be arranged in communication with the motor vehicle for such that pressurizing of the vessel occurs during operation of the vehicle. The auxiliary drive means may be coupled to the gearbox. The auxiliary drive means may include an activation means which may be in the form of a valve which may be activated in order to allow the auxiliary drive means to drive the gearbox when the motor is inoperable.

A deactivating means may be provided for deactivating the motor and inhibiting displacement of the retractable ladder arrangement, preferably when there is a predetermined resistance provided to the displacement of the retractable ladder arrangement. The deactivating means may be located at the motor and may be in the form of a pressure sensor.

The controller may be located in any one or more locations of the group including the cab of the motor vehicle, a control tower configured to control access to certain areas in industrial structures or workshops, towards a region on the vehicle where the ladder arrangement may be mounted thereon for allowing a worker to control the ladder arrangement whilst in view of a user making use of the ladder arrangement. The displacement means may be controlled by a remote-control means located on the outside of the cab of the motor vehicle. Typically, the remote-control means may be located in a position which permits a user access to the remote-control means from a ground surface. The remote-control means may include a display for displaying the condition of the ladder arrangement and stepping formations, typically being in the form of a touchscreen. The touchscreen may be protected by a protective cover. The protective cover may be manufactured from plastic, glass, polyvinyl chloride or any other suitable material.

The controller may be configured to be in communication with a park brake of the motor vehicle such that when the park brake is activated or deactivated, the linkage members and stepping formations are extended or retracted respectively.

Hand grips may be mountable on the linkages of the ladder arrangement, preferably from a height in the region of 1 m to 1.5 m, preferably 1.3 m, from the ground when the ladder arrangement is in the extended condition for assisting a user to climb the ladder arrangement in the extended condition.

According to a further aspect of the invention there is provided a securing means for securing the ladder arrangement to a vehicle, in order for the ladder to extend downwardly from the vehicle when the ladder is in the extended open position, and to be retracted towards a cabin of the vehicle when the ladder arrangement is displaced to the collapsed retracted condition.

A secondary displacement means may be provided for allowing the ladder arrangement to be displaceable to a stowage position once the ladder arrangement has been displaced to the retracted condition. Preferably the retracted ladder arrangement is pivoted into the stowage position.

DETAILED DESCRIPTION OF THE DRAWINGS

A linkage assembly for a retractable ladder arrangement for a heavy-duty mining vehicle or the like and retractable ladder for a heavy-duty mining vehicle or the like in accordance with the invention will now be described by way of non-limiting examples with reference to the accompanying drawings.

Figure 1:
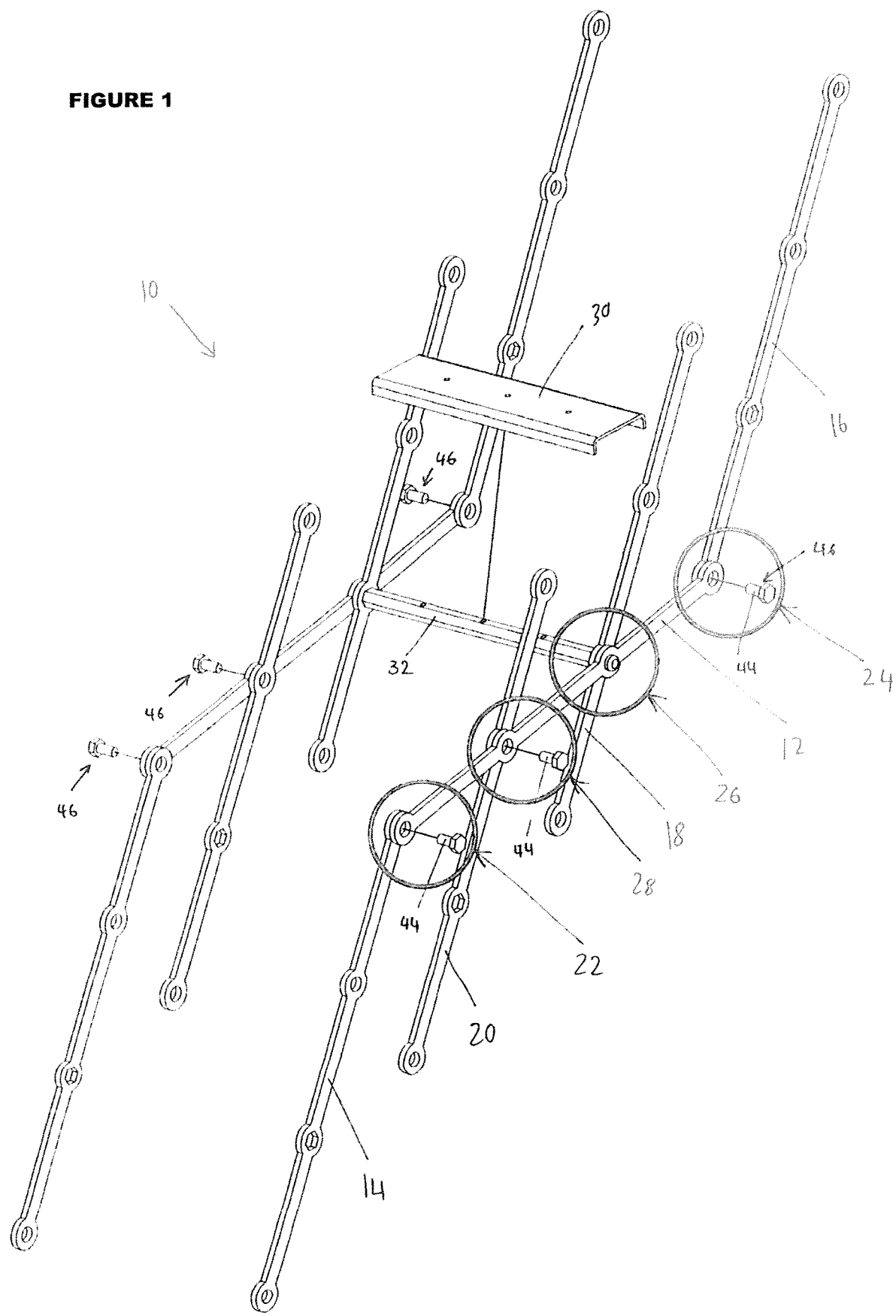
FIG. 1 shows a three-dimensional schematic of a linkage assembly in accordance with a first embodiment of the invention.
Figure 2:
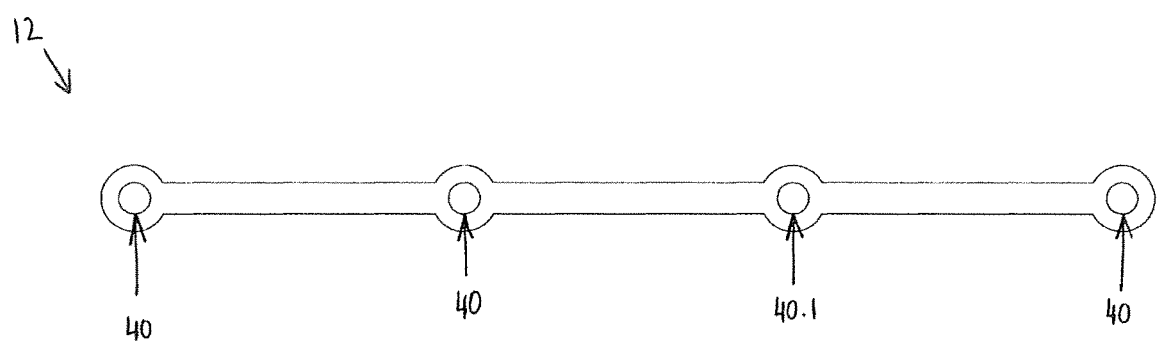
FIGS. 2 and 3 show enlarged schematics of elongate linkage members of the linkage assembly shown in FIG. 1.
Figure 3:
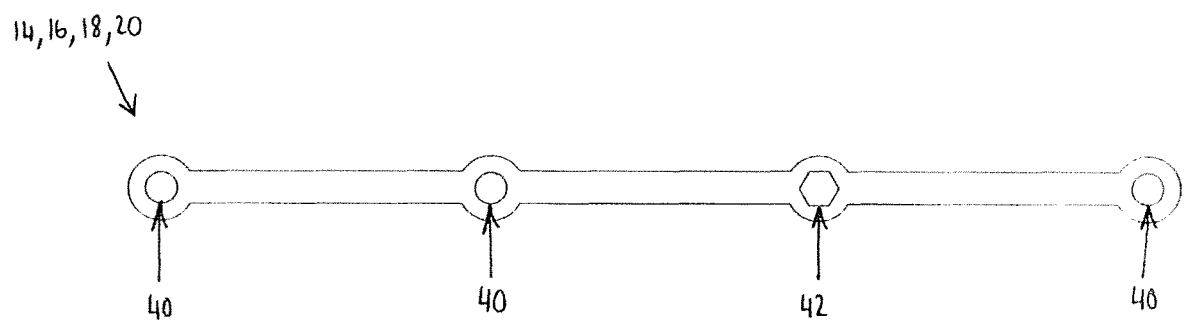
Figure 4:
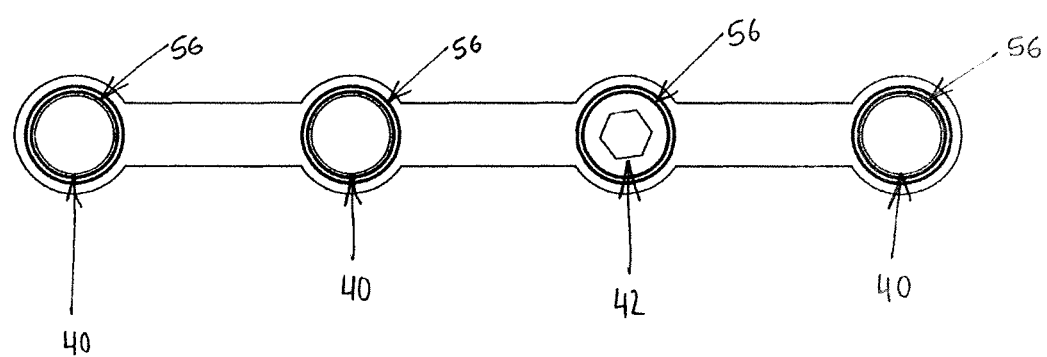
FIG. 4 shows a detailed schematic of FIG. 3.
Figure 5:
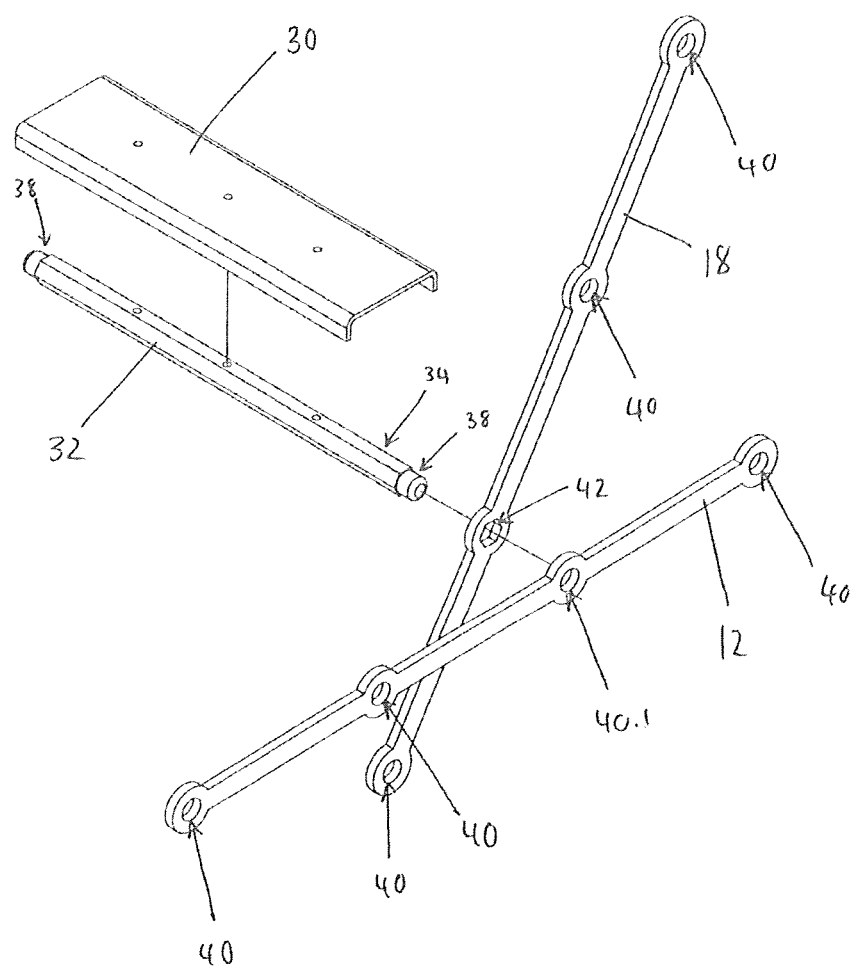
FIG. 5 shows an exploded view of a portion of the linkage assembly shown in FIG. 1.
Figure 6:
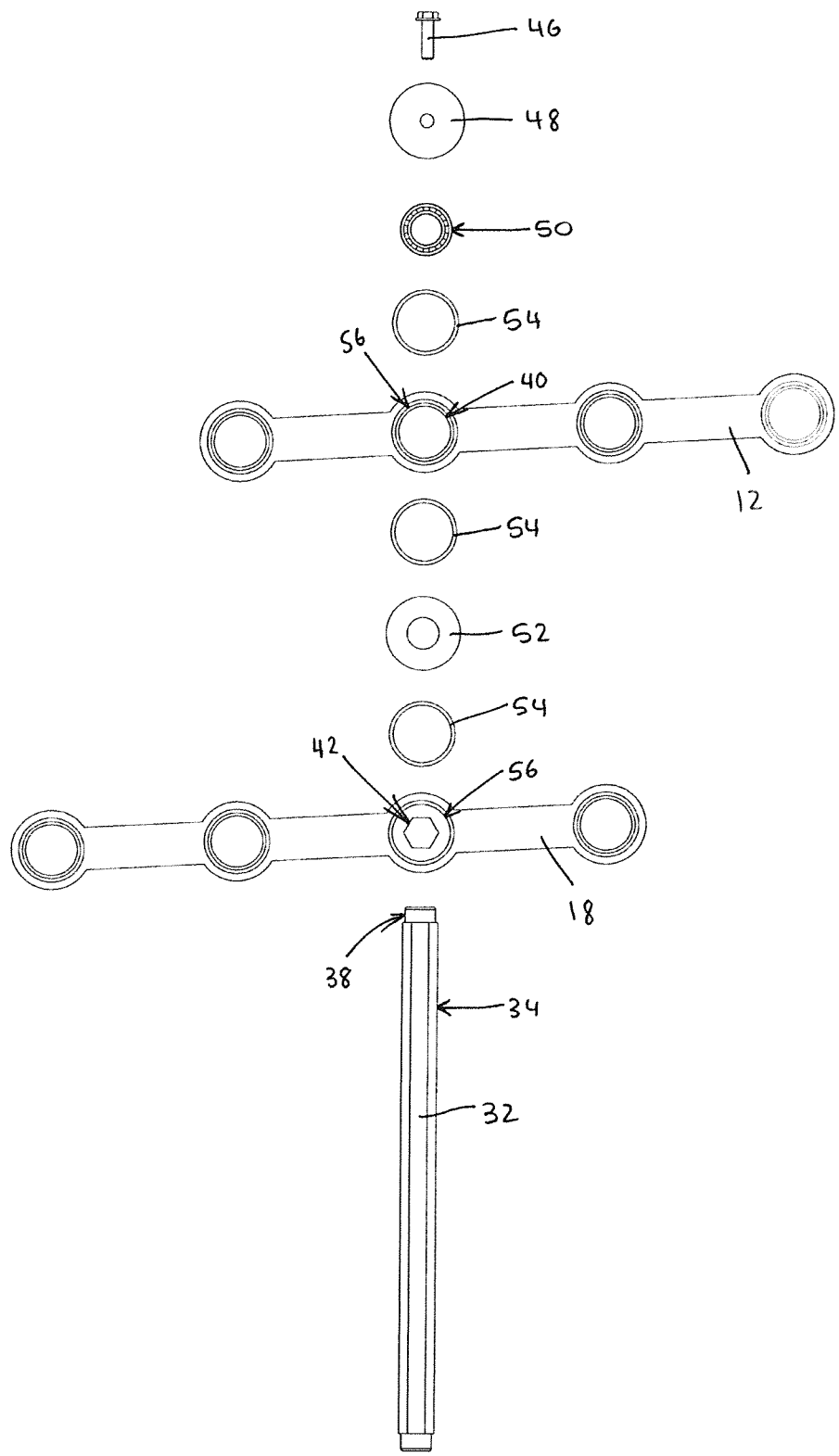
FIG. 6 shows a detailed exploded view of parts forming a step support connecting arrangement of the linkage assembly.
Figure 7:
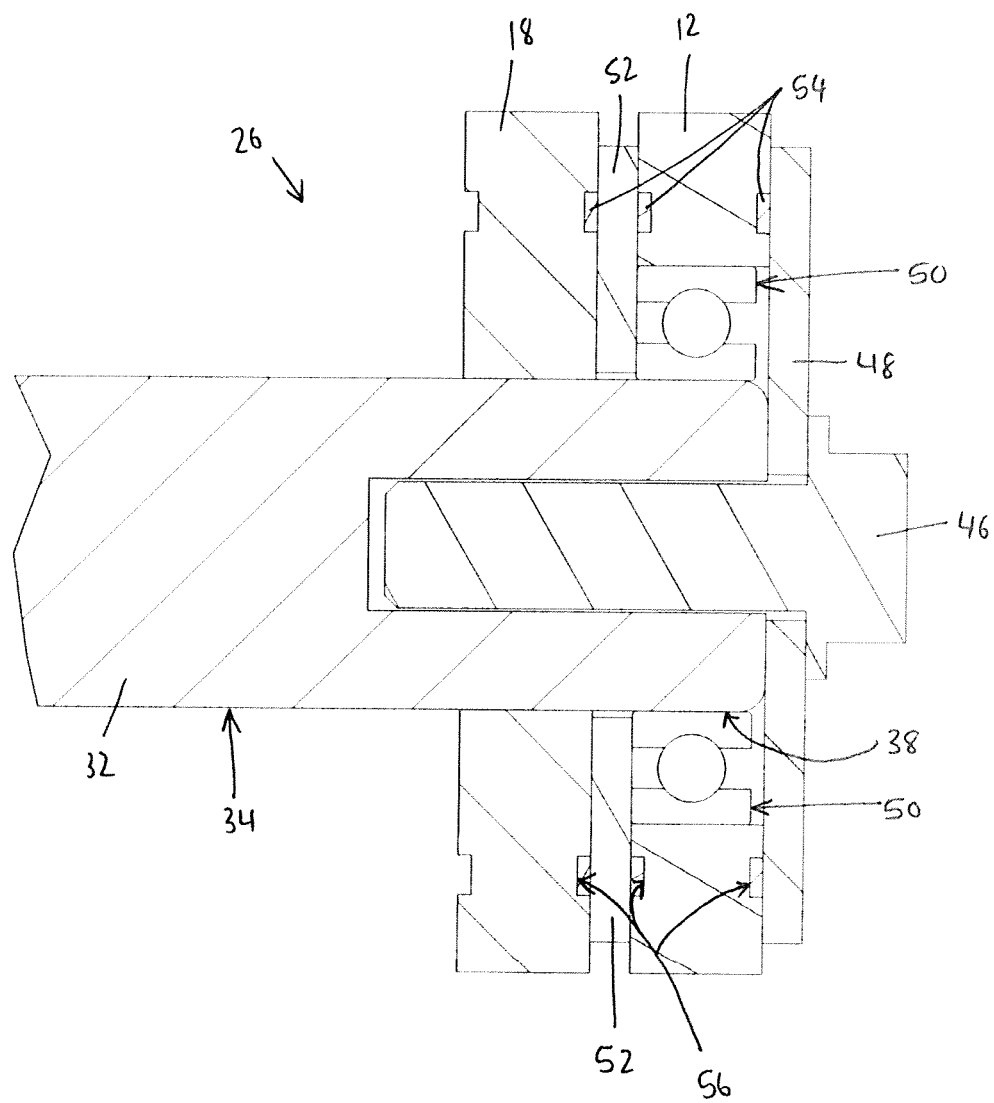
FIG. 7 shows an enlarged partially sectioned view of the step support connecting arrangement shown in FIG. 6.

Referring now to the drawings, and in particular, FIGS. 1 to 7, reference numeral 10 generally depicts a linkage assembly in accordance with the invention which includes first, second, third, fourth and fifth elongate linkage members 12, 14, 16, 18 and 20 respectively, a first connecting arrangement 22 for connecting and allowing pivotal displacement between proximal end regions of the first and second elongate linkage members 12 and 14 respectively, a second connecting arrangement 24 for connecting and allowing pivotal displacement between distal end regions of the first and third elongate linkage members 12 and 16 respectively, a step support connecting arrangement 26 for connecting the first and fourth elongate linkage members 12 and 18 respectively, the step support connecting arrangement 26 being located inwardly the second connecting arrangement 24 and provides a stepping formation 30 for a user, the step support connecting arrangement 26 including a shaft 32 having a first portion 34 which is shaped to be received by and inhibit relative pivotal displacement between the fourth linkage member 18 and the stepping formation 30 during extension and retraction of the retractable ladder arrangement 36 and a second portion 38 shaped to be received by and allow pivotal displacement between the first and fourth linkage members 12 and 18, and a third connecting arrangement 28 for connecting and allowing pivotal displacement between the first and fifth elongate linkage members 12 and 20 respectively, the fifth elongate linkage member 20 being located intermediate the first and step support connecting arrangements 22 and 26 respectively.

The first elongate linkage member 12 includes four receiving formations in the form of circular apertures 40 defined therein for receiving the first, second, third and step support connecting arrangements 22, 24, 28 and 26 respectively, complementally therein. The circular apertures 40 allow pivotal displacement between the first 12 and second 14, first 12 and third 16, first 12 and fourth 18, and first 12 and fifth 20 linkage members, respectively.

The second to fifth elongate linkage members 14, 16, 18 and 20 respectively, include three circular apertures 40 and a step support aperture 42 being generally non-circular, typically hexagonal, in cross-section for receiving the first portion 34 of the shaft 32 of the step support connecting arrangement 26. The non-circular step support aperture 34 is configured to inhibit relative displacement between the fourth elongate linkage member 18 and the stepping formation 30.

The first, second and third connecting arrangements 22, 24 and 28 include shaft portions 44 which are configured to be received complementally the apertures 40 in the respective corresponding linkage members 12, 14, 16, 18 and 20 to allow relative pivotal displacement therebetween. The connecting arrangements 22, 24 and 28 further include a retaining member in the form of a screw bolt 46 and washer 48 for retaining the shaft portions 44 in the apertures 40. The connecting arrangements 22, 24 and 28 include bearing assemblies 50 which are shaped and configured to be arranged between the shaft portions 44 and apertures 40 to improve pivotal displacement between the respective linkages and shafts. The connecting arrangements 22, 24 and 28 include spacers in the form of washers or rings 52 for spacing the respective corresponding linkage members apart and to facilitate retention of the bearing assemblies 50 in the apertures 40. The connecting arrangements 22, 24 and 28 further include sealing members in the form of nylon dust seals 54 arranged within corresponding grooves or recesses 56 in the linkage members 12, 14, 16, 18 and 20 surrounding the apertures 40.

The first portion 34 of the shaft 32 of the step support connecting arrangement 26 is configured to be received by the step support aperture 42 of the fourth linkage member 18 and a second portion 38 is configured to be received by a third aperture 40.1 of the first linkage member 12. The first portion 34 of the shaft 32 is of hexagonal cross-section. The first portion 34 is configured to receive securing means in the form of a plurality of bolts (not shown) for securing the stepping formation 30 to the first portion 34 of the shaft 32. The second portion 38 of the shaft 32 is of circular cross-section to permit relative displacement of the first linkage member 12 and the stepping formation 30.

The step support connecting arrangement 26 includes a retaining means in the form of a bolt 46 for retaining the shaft 32 in position in the apertures 40 and 42 of the first and fourth linkage members 12 and 18, respectively. The step support connecting arrangement 26 includes a bearing 50 which is shaped and configured to be arranged between the second portion 38 of the shaft 32 and the aperture 40.1 of the first linkage member 12 to improve pivotal displacement therebetween. The step support connecting arrangement 26 includes a spacer element in the form of a washer or ring 48 for spacing the first and fourth linkage members 12 and 18 apart. The step support connecting arrangement 26 further includes sealing members in the form of dust seals 54 which are manufactured from metal.

Figure 9:
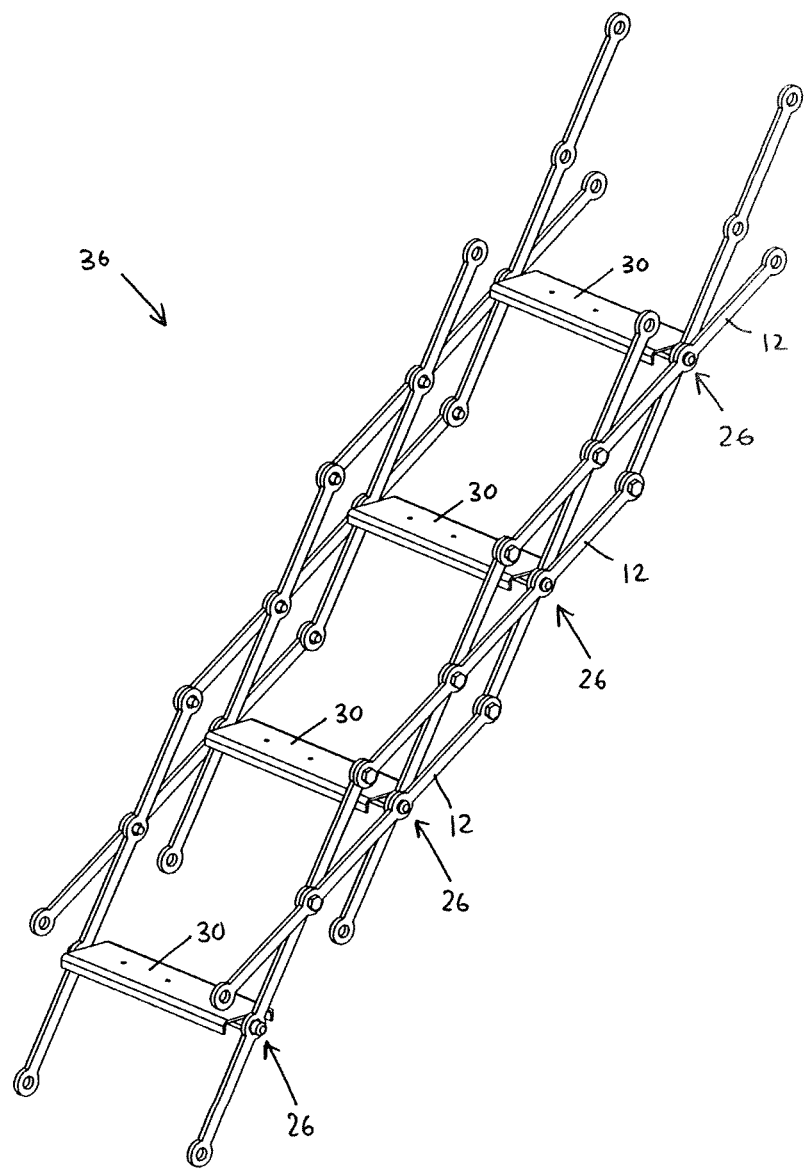
FIGS. 9 and 10 show portions of a first embodiment of a retractable ladder in a fully retracted and partially extended condition respectively.
Figure 10:
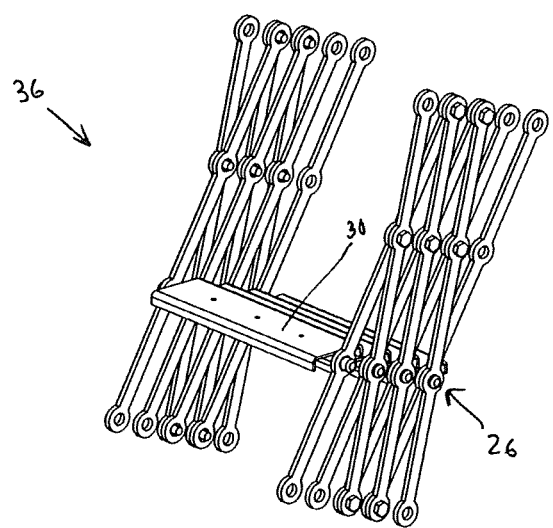
Figure 11:
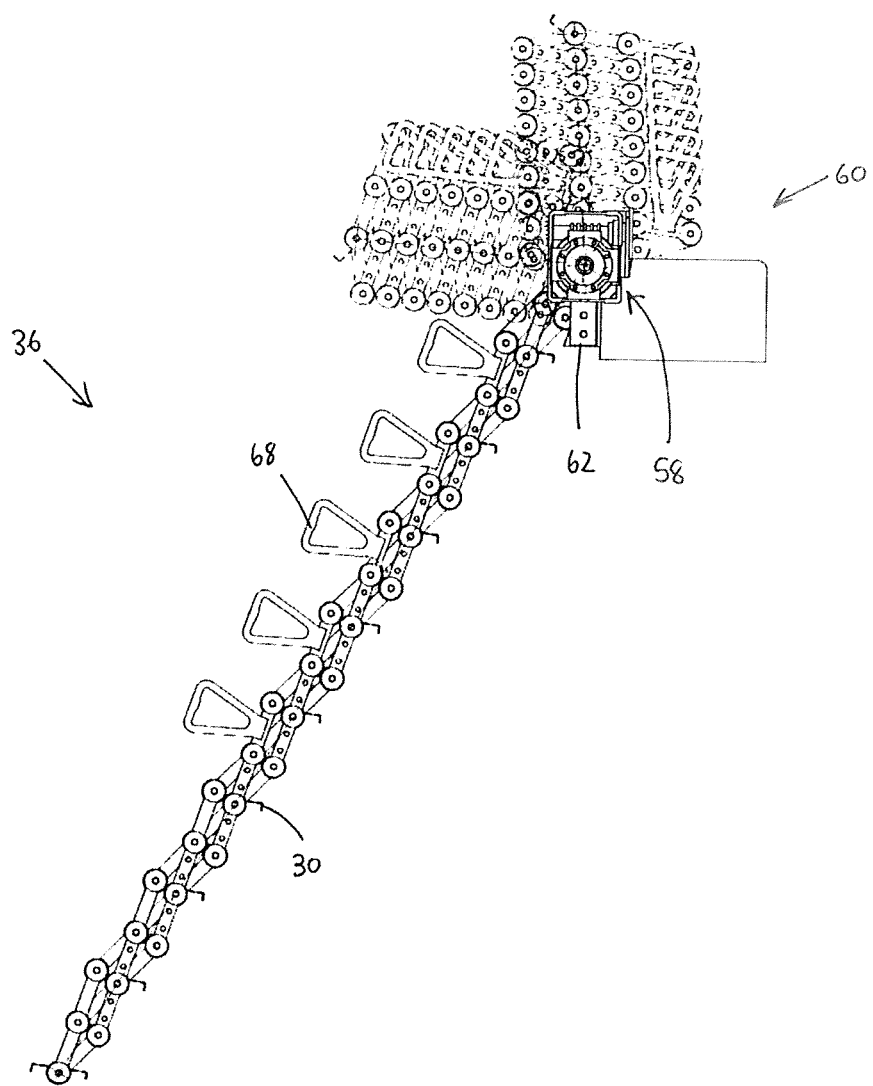
FIG. 11 is a schematic showing the first embodiment of the retractable ladder arrangement in a fully extended, retracted and stowed condition, respectively.
Figure 12:
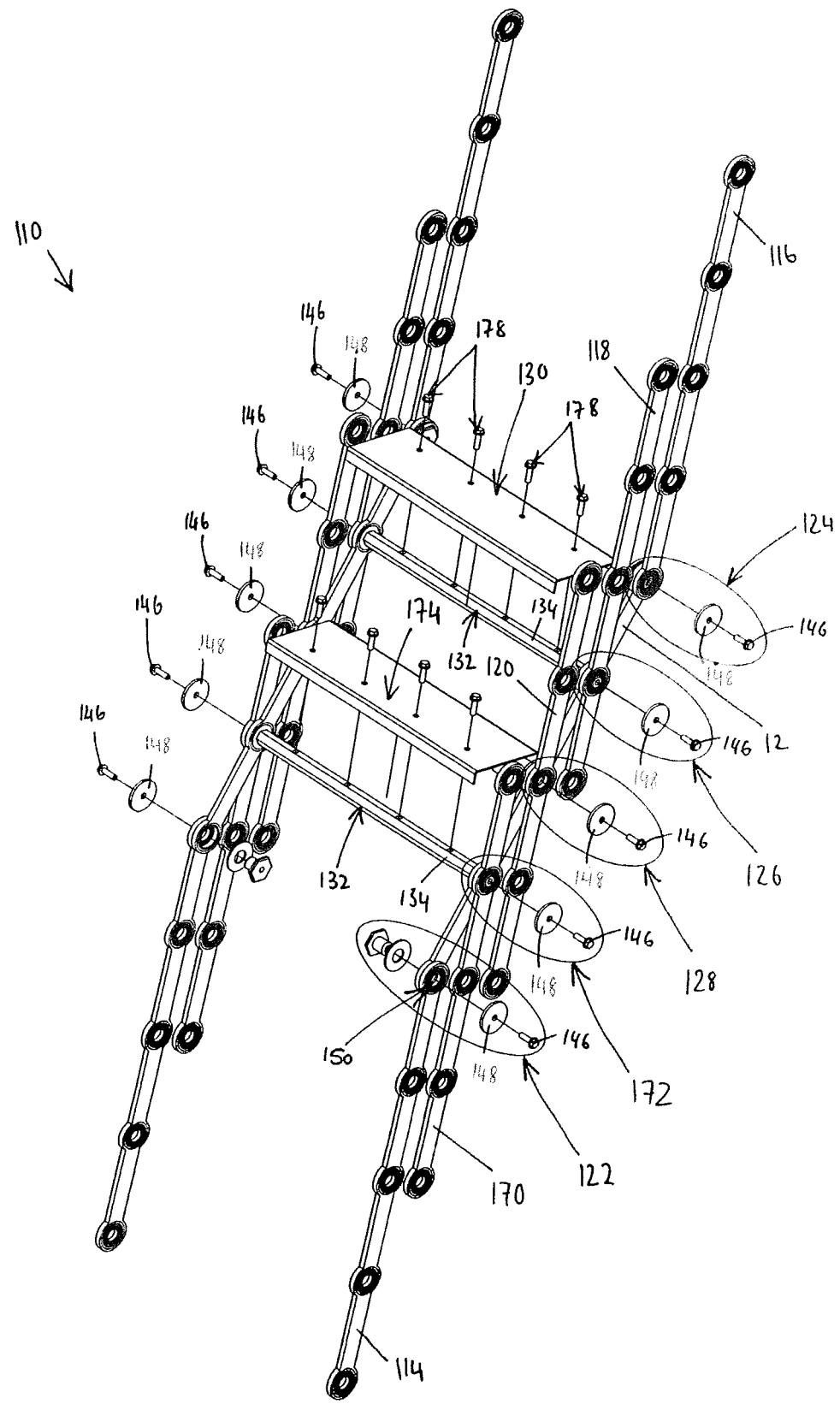
FIG. 12 shows a three-dimensional schematic of a linkage assembly in accordance with a second embodiment of the invention.
Figure 13:
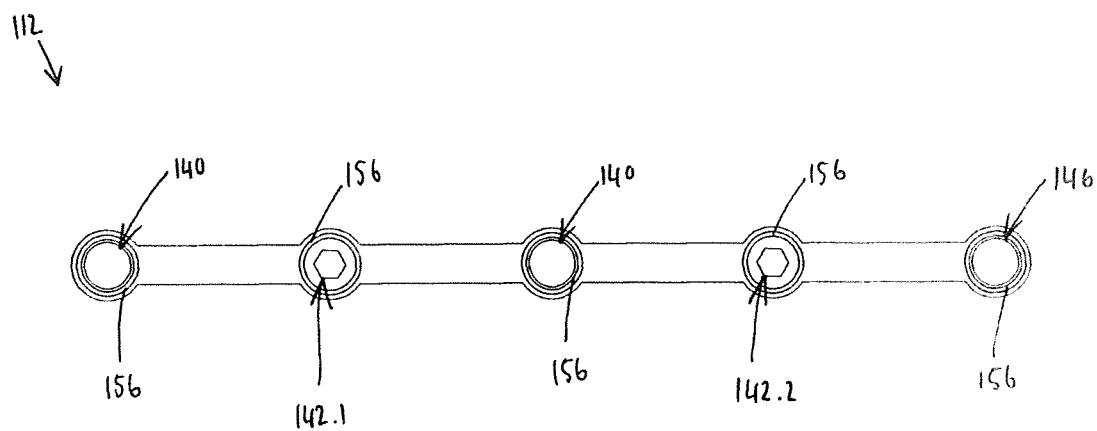
FIGS. 13 and 14 show enlarged schematics of elongate linkage members of the linkage assembly shown in FIG. 12.
Figure 14:
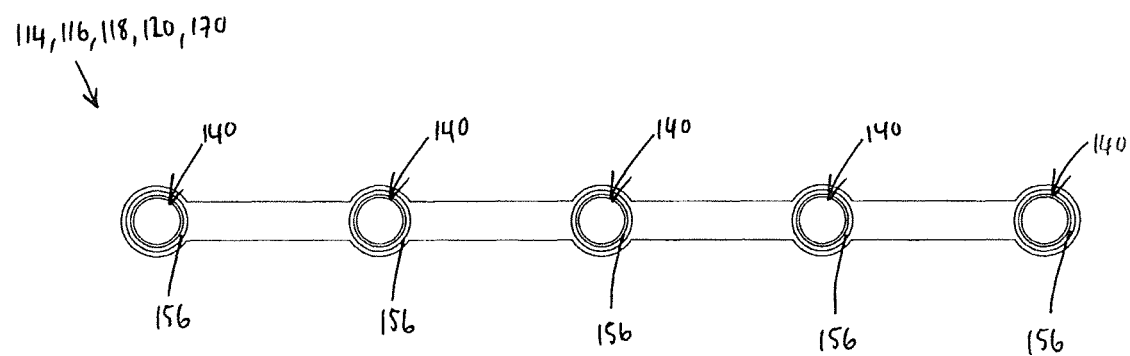
Figure 15:
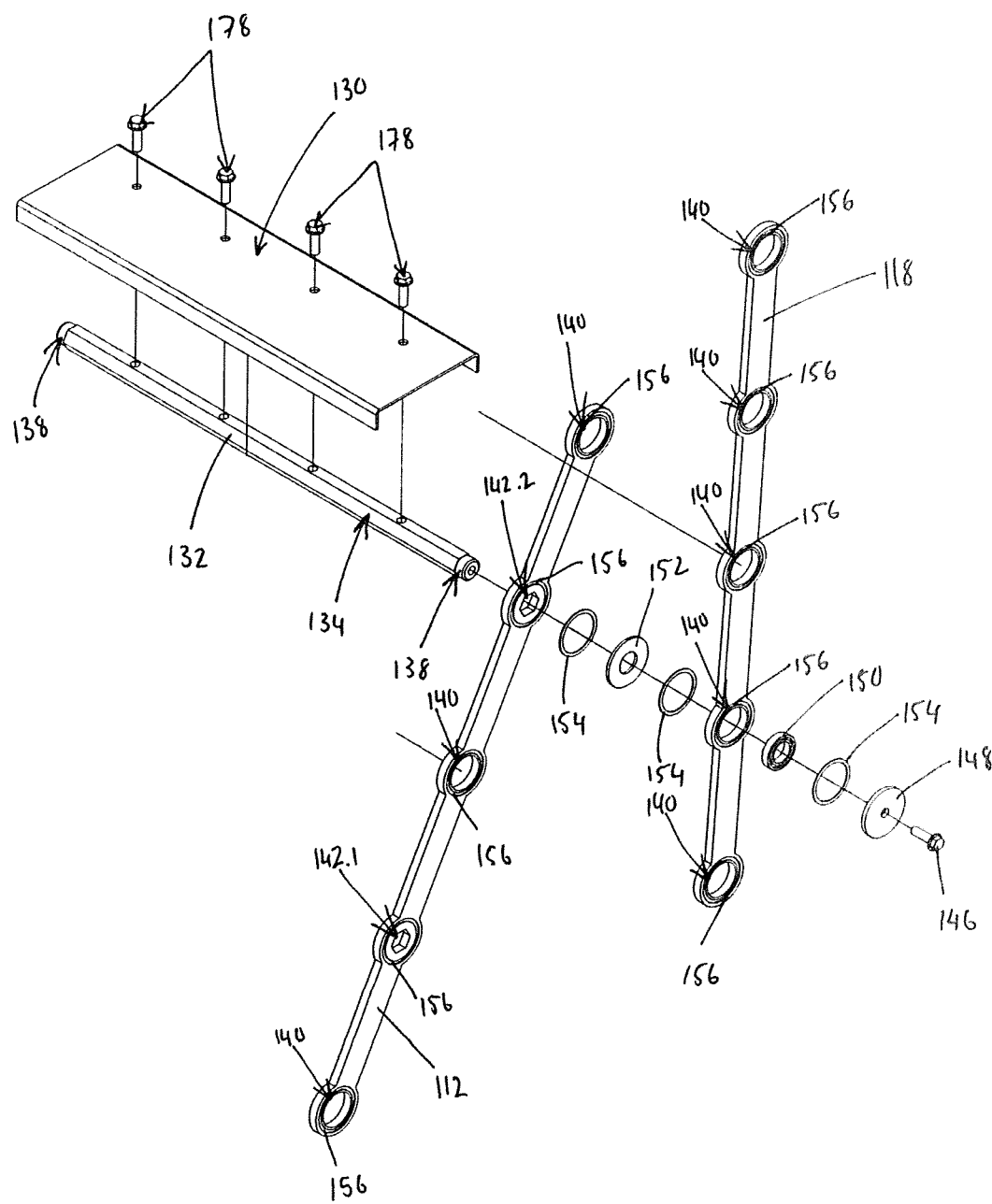
FIG. 15 shows an exploded view of a portion of the linkage assembly shown in FIG. 12.
Figure 16:
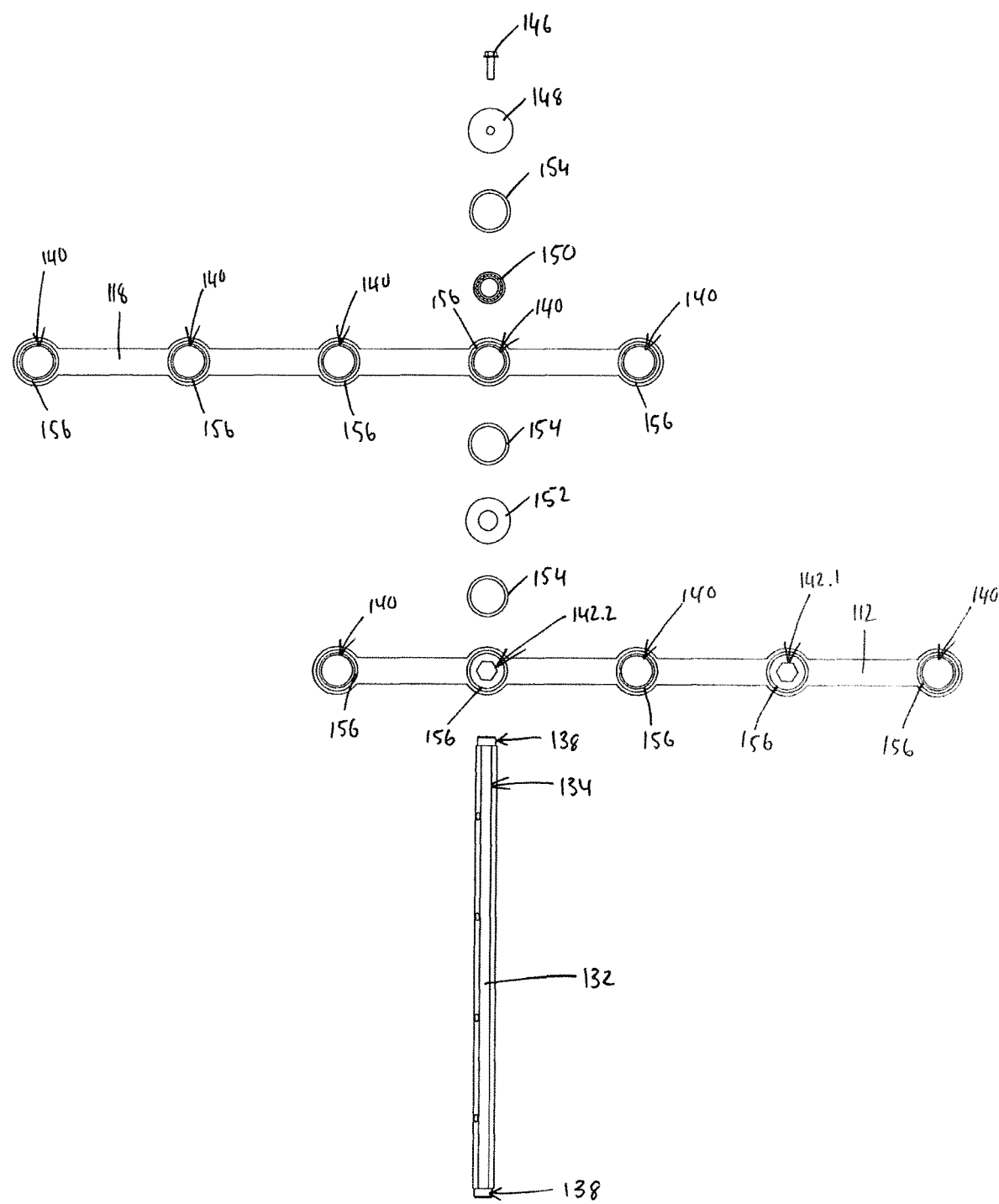
FIG. 16 shows a detailed exploded view of parts forming a step support connecting arrangement of the linkage assembly shown in FIG. 12.
Figure 17:
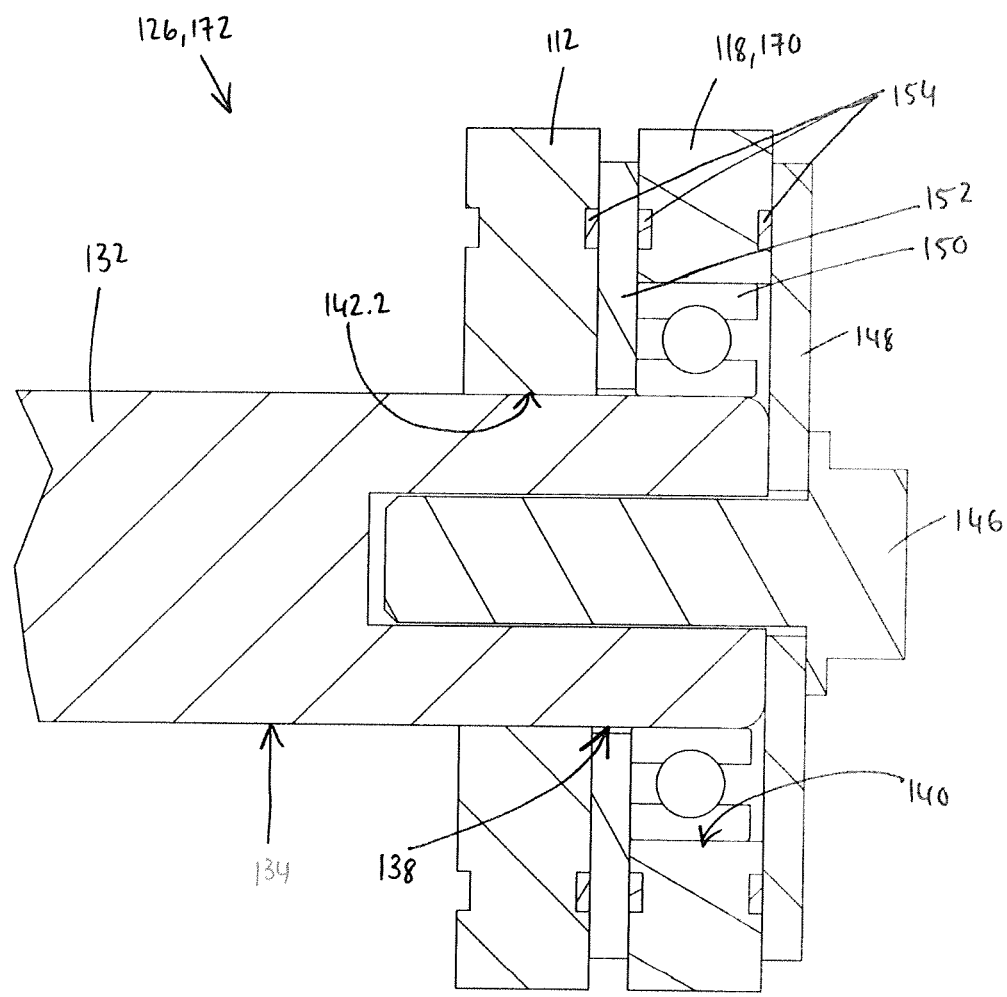
FIG. 17 shows an enlarged partially sectioned view of a step support connecting arrangement shown in FIG. 16.

Referring now to FIGS. 9 to 11, reference numeral 36 generally depicts a retractable ladder arrangement for a vehicle (not shown), which retractable ladder arrangement 36 includes a plurality of linkage assemblies 10, as hereinbefore described, connected in an end-to-end configuration, a primary displacement means in the form of a motor (not shown) and gearbox 58 for displacing the linkage assemblies 10 between a collapsed retracted condition and an extended condition, a coupling means in the form of a head assembly 60 for coupling the linkage assemblies to the motor (not shown) and gearbox 58 and a controller (not shown) for controlling the primary displacement means.

The motor (not shown) is energised by an energy source of a motor vehicle (not shown). The energy source is in the form of an electrical energy source (not shown) which provides either AC or DC current. The head assembly 60 includes a gearbox mounting plate 62 for coupling the gearbox 58 to the linkage assemblies 10.

Figure 8:
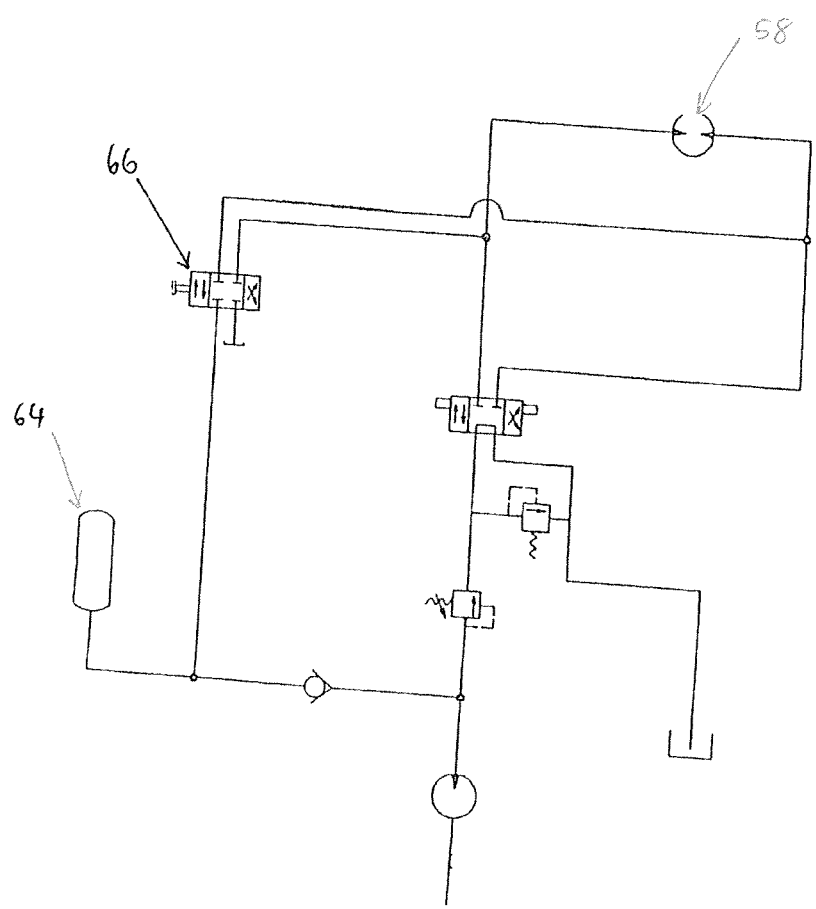
FIG. 8 shows a schematic diagram of a hydraulic circuit of a retractable ladder arrangement.

Referring now to FIG. 8, an auxiliary drive means in the form of a pressure vessel 64 is provided for displacing the gearbox 58 in the event that the motor (not shown) is inoperable.

The pressure vessel 64 is arranged in communication with the motor vehicle (not shown) such that pressurising of the vessel 64 occurs during operation of the vehicle (not shown). The pressure vessel 64 includes an activation means in the form of a valve 66 which is activated in order to allow the pressure vessel 64 to drive the gearbox 58 when the motor (not shown) is inoperable. The pressure vessel 64 is coupled to the gearbox 58.

A deactivating means in the form of a pressure sensor (not shown) is provided for deactivating the motor (not shown) and inhibiting displacement of the retractable ladder arrangement 36 when there is a predetermined resistance provided to the displacement of the retractable ladder arrangement 36.

Hand grips 68 are mountable on the linkage members 12, 14, 16, 18 and 20 for assisting a user to climb the ladder arrangement 36 in the extended condition.

In a second embodiment of the invention, shown in FIGS. 12 to 17, reference numeral 110 refers generally to a linkage assembly for a retractable ladder arrangement which includes first, second, third, fourth, fifth and sixth elongate linkage members 112, 114, 116, 118, 120 and 170 respectively, a first connecting arrangement 122 for connecting and allowing pivotal displacement between proximal end regions of the first and second elongate linkage members 112 and 114 respectively, a second connecting arrangement 124 for connecting and allowing pivotal displacement between distal end regions of the first and third elongate linkage members 112 and 116 respectively, a first step support connecting arrangement 126 for connecting the first and fourth elongate linkage members 112 and 118, the first step support connecting arrangement 126 being located inwardly the second connecting arrangement 124 and providing a first stepping formation 130 for a user, a third connecting arrangement 128 for connecting and allowing pivotal displacement between the first and fifth elongate linkage members 112 and 120 respectively, the fifth elongate linkage member 120 being located inwardly the first step support connecting arrangement 126, a second step support connecting arrangement 172 for connecting the first and sixth elongate linkage members 112 and 170 respectively, the second step support connecting arrangement 172 being located intermediate the third and first connecting arrangements 128 and 122 respectively, and providing a second stepping formation 174 for a user, wherein the step support connecting arrangements 126 and 172 include shafts 132 having first portions 134 which are shaped to be received by and inhibit relative pivotal displacement between the first linkage member 112 and the first stepping formation 130, and the first linkage member 112 and the second stepping formation 174 respectively, during the extension and retraction of the retractable ladder arrangement 136 and second portions 138 shaped to be received by and allow pivotal displacement between the first and fourth linkage members 112 and 118, respectively, and the first and sixth linkage members 112 and 170, respectively.

The second to sixth elongate linkage members 114, 116, 118, 120 and 170 include five receiving formations in the form of circular apertures 140 defined therein for receiving the first, second, third, first step support and second step support connecting arrangements 122, 124, 128, 126 and 172, respectively, complementally therein. The circular apertures 140 allow pivotal displacement between the first 112 and second 114, first 112 and third 116, first 112 and fourth 118, first 112 and fifth 120, first 112 and sixth 170 linkage members, respectively.

The first, second and third connecting arrangements 122, 124 and 128 include shaft portions 144 which are configured to be received complementally the apertures 140 in the respective corresponding linkage members 112, 114, 116, 118, 120 and 170 to allow relative pivotal displacement therebetween. The connecting arrangements 122, 124 and 128 further include a retaining member in the form of a screw bolt 146 and washer 148 for retaining the shaft portions 144 in the apertures 140. The connecting arrangements include a locating member 176 for locating and aligning the apertures 140 of the respective corresponding linkage members 112, 114, 116, 118, 120 and 170 and screw bolts 146 relative one another. The connecting arrangements 122, 124 and 128 include bearing assemblies 150 which are shaped and configured to be arranged between the shaft portions 144 and apertures 140 to improve pivotal displacement between the respective linkages and shafts. The connecting arrangements 122, 124 and 128 include spacers in the form of washers or rings 152 for spacing the respective corresponding linkage members apart and to facilitate retention of the bearing assemblies 150 in the apertures 140. The connecting arrangements 122, 124 and 128 further include sealing members in the form of dust seals 154 arranged within corresponding grooves or recesses 156 in the linkage members 112, 114, 116, 118, 120 and 170 surrounding the apertures 140. The dust seals 154 are typically manufactured from nylon.

The first elongate linkage member 112 includes three circular apertures 140 and two step support apertures 142.1 and 142.2 being generally non-circular, typically hexagonal, in cross-section for receiving the first portion 134 of the shaft 132 of the step support connecting arrangements 126 and 172, respectively. The hexagonal step support apertures 142.1 and 142.2 are configured to inhibit relative displacement between the first elongate linkage member 112 and the first stepping formation 130, and between the first elongate linkage member 112 and the second stepping formation 174, respectively.

The first portion 134 of the shafts 132 of the step support connecting arrangements 126 and 172 is configured to be received by the step support apertures 142.1 and 142.2 of the first linkage member 112 and the second portion 138 is configured to be received by the apertures 140 of fourth and sixth linkage members 118 and 170, respectively. The first portion 134 of the shafts 132 is of hexagonal cross-section. The first portion 134 is configured to receive securing means in the form of a plurality of screw threaded bolt assemblies 178 for securing the stepping formations 130 and 174 to the first portions 134 of the shafts 132. The second portion 138 of the shafts 132 is of circular cross-section to permit relative displacement of the fourth and sixth linkage members 118 and 170 and the stepping formations 130 and 174, respectively.

The step support connecting arrangements 126 and 172 include retaining members in the form of a bolts 146 and washers 148 for retaining the shafts 132 in position in the apertures 140 of the fourth and first linkage members 118 and 112, respectively, and in the apertures 140 of the sixth and first linkage members 170 and 112, respectively. The step support connecting arrangements 126 and 172 include bearing assemblies 150 which are sized, shaped and configured to be arranged between the second portion 138 of the shafts 132 and the apertures 140 of the fourth and sixth linkage member 118 and 170, respectively, to improve pivotal displacement therebetween. The step support connecting arrangements 126 and 172 include spacer elements in the form of washers or rings 152 for spacing apart the first and fourth linkage members 112 and 118, and the first and sixth linkage members 112 and 170, respectively. The step support connecting arrangements 126 and 172 further include sealing members in the form of dust seals 154 which are typically manufactured from nylon.

It is to be appreciated that the elongate linkage members can be interchanged so as to allow the linkage assembly to have various alternative configurations. In particular, the elongate linkage members can be interchanged and assembled so that the second to sixth elongate linkage members include the hexagonal step support apertures and the first elongate linkage member includes only circular apertures.

Figure 18:
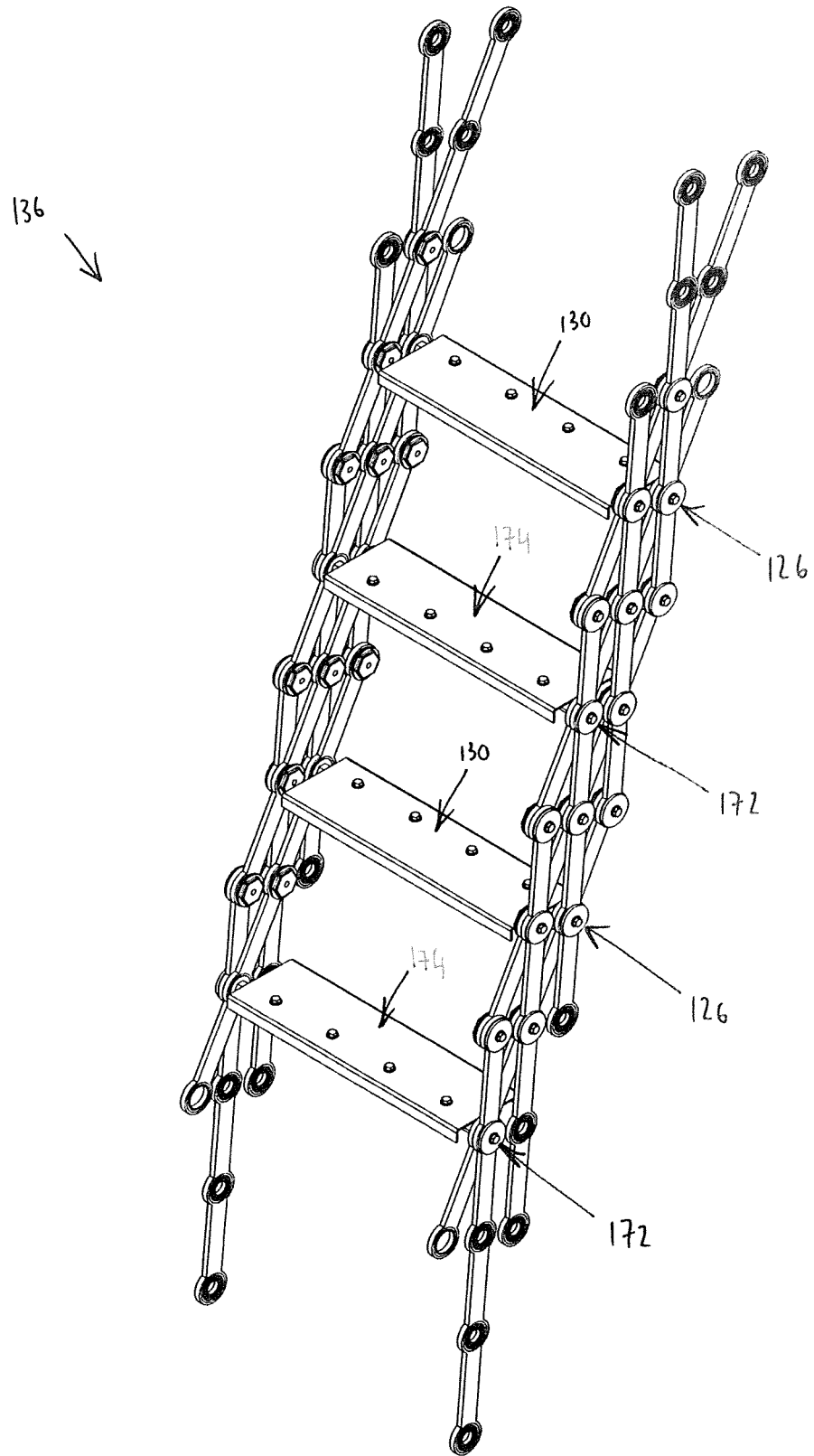
FIGS. 18 and 19 show portions of a second embodiment of a retractable ladder in an extended and retracted condition, respectively.
Figure 19:
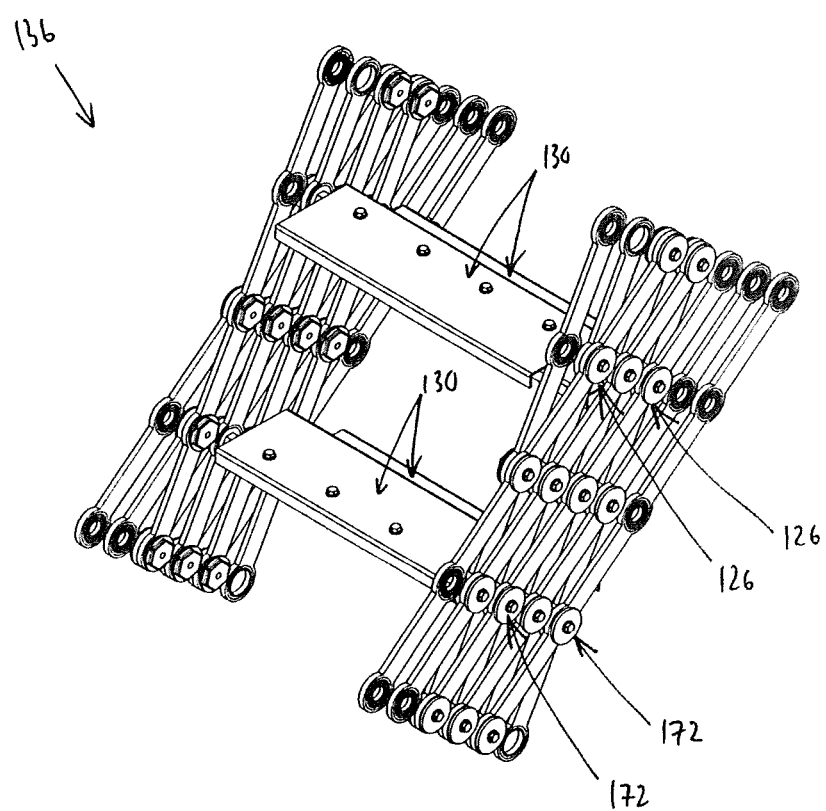
Figure 20:
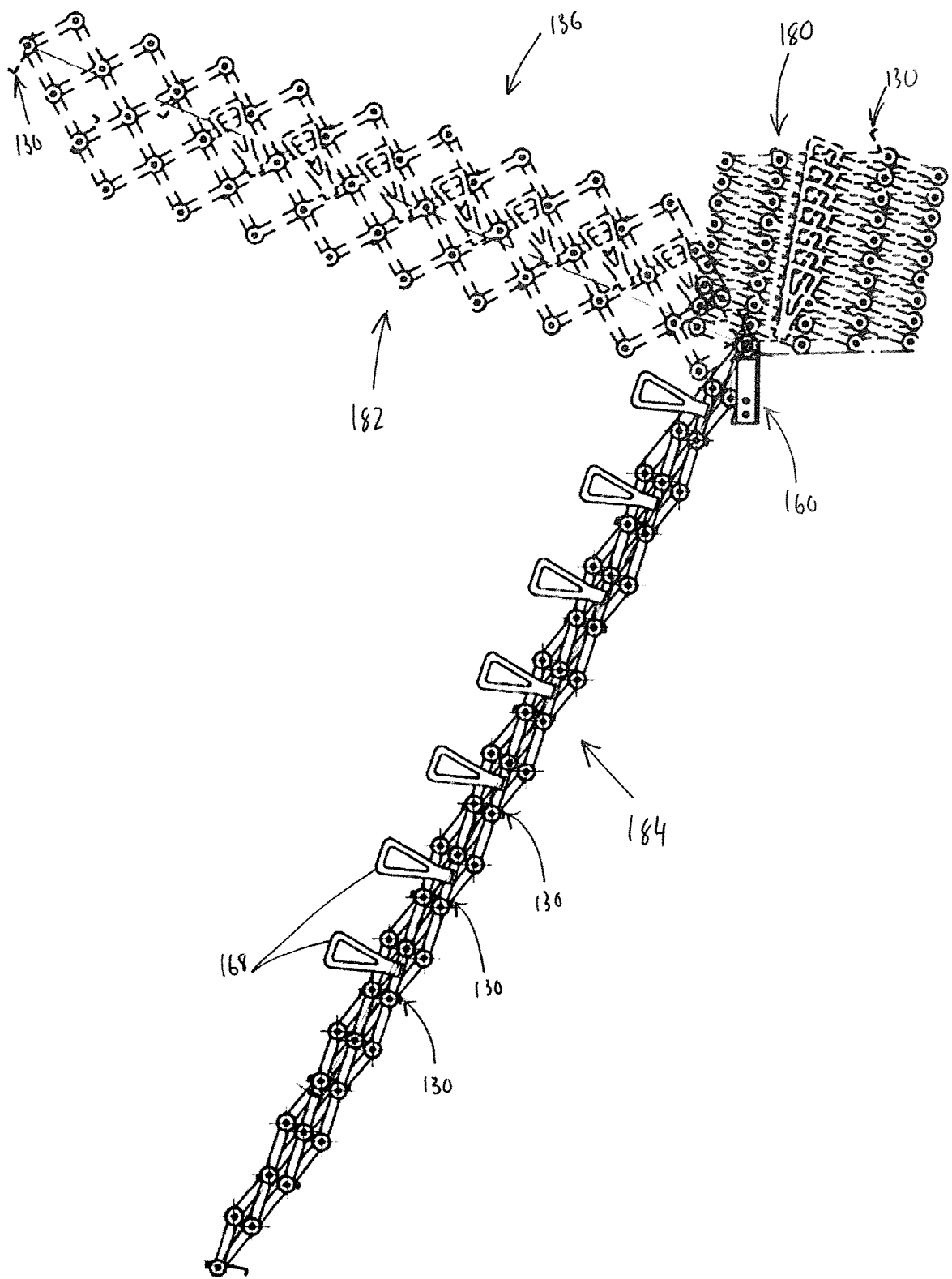
FIG. 20 is a schematic showing the second embodiment of the retractable ladder arrangement in a fully extended, retracted and stowed condition, respectively.

Referring now to FIGS. 18 to 20, reference numeral 136 generally depicts a retractable ladder arrangement for a vehicle (not shown), which retractable ladder arrangement 136 includes a plurality of linkage assemblies 110, as hereinbefore described, connected in an end-to-end configuration, a primary displacement means in the form of a motor (not shown) and gearbox (not shown) for displacing the linkage assemblies 110 between a collapsed retracted condition and an extended condition, a coupling means in the form of a head assembly 160 for coupling the linkage assemblies to the motor (not shown) and gearbox (not shown) and a controller (not shown) for controlling the primary displacement means.

The motor (not shown) is energised by an energy source of a motor vehicle (not shown). The energy source is in the form of an electrical energy source (not shown) which provides either AC or DC current. The head assembly 70 includes a gearbox mounting plate (not shown) for coupling the gearbox (not shown) to the linkage assemblies 110.

An auxiliary drive means in the form of a pressure vessel (not shown) is provided for displacing the gearbox (not shown) in the event that the motor (not shown) is inoperable.

The pressure vessel (not shown) is arranged in communication with a motor vehicle (not shown) such that pressurising of the vessel (not shown) occurs during operation of the vehicle (not shown). The pressure vessel (not shown) includes an activation means in the form of a valve (not shown) which is activated in order to allow the pressure vessel (not shown) to drive the gearbox (not shown) when the motor (not shown) is inoperable. The pressure vessel (not shown) is coupled to the gearbox (not shown).

A deactivating means in the form of a pressure sensor (not shown) is provided for deactivating the motor (not shown) and inhibiting displacement of the retractable ladder arrangement 136 when there is a predetermined resistance provided to the displacement of the retractable ladder arrangement 136.

The controller (not shown) is located in any one or more locations of the group including the cab (not shown) of the motor vehicle (not shown), a control tower (not shown) configured to control access to certain areas in industrial structures or workshops, towards a region on the vehicle (not shown) where the ladder arrangement 136 is mounted thereon for allowing a worker to control the ladder arrangement 136 whilst in view of a user making use of the ladder arrangement 136. The displacement means (not shown) is controlled by a remote-control means (not shown) located on the outside of the cab of the motor vehicle (not shown). Typically, the remote-control (not shown) is located in a position which permits a user access to the remote-control means (not shown) from a ground surface. The remote-control means (not shown) includes a display (not shown) for displaying the condition of the ladder arrangement 136 and stepping formations 130 and 174 in use, typically being in the form of a touchscreen (not shown). The touchscreen (not shown) is protected by a protective cover (not shown). The protective cover (not shown) is manufactured from plastic, glass, polyvinyl chloride or any other suitable material.

The controller (not shown) is configured to be in communication with a park brake (not shown) of the motor vehicle (not shown) such that when the park brake (not shown) is activated or deactivated, the linkage members 112, 114, 116, 118, 120 and 170 and stepping formations 130 and 174 are extended or retracted respectively.

Hand grips 168 are mountable on the linkage members 112, 114, 116, 118, 120 and 170 typically from a height of 1.3 m from the ground when the ladder arrangement 136 is in an extended condition 184 for assisting a user to climb the ladder arrangement 136 in the extended condition.

A secondary displacement means (not shown) is provided for allowing the ladder arrangement to be displaceable to a stowage position 180 once the ladder arrangement 136 has been displaced to the retracted condition 182 from the extended condition 184. The retracted ladder arrangement is typically pivoted into the stowage position 180.

Although only certain embodiments of the invention have been described herein, it will be understood by any person skilled in the art that other modifications, variations, and possibilities of the invention are possible. Such modifications, variations and possibilities are therefore to be considered as falling within the spirit and scope of the invention and hence form part of the invention as herein described and/or exemplified.

It shall further be understood that the examples are provided for illustrating the invention further and to assist a person skilled in the art with understanding the invention and is not meant to be construed as unduly limiting the reasonable scope of the invention.

The applicant believes that a linkage assembly for a retractable ladder in accordance with the invention may be advantageous in that it provides a simple, elegant and effective solution for extending the length of a retractable ladder arrangement to facilitate access to and from a heavy-duty mining vehicle or the like. The Applicant believes it to be a further advantage that the invention provides an auxiliary drive mechanism for extending the ladder arrangement when the motor is inoperable during and emergency.

The invention claimed is:

1. A linkage assembly for a retractable ladder arrangement which includes:
   a plurality of elongate linkage members;
   a first connecting arrangement for connecting and allowing pivotal displacement between proximal end regions of a first linkage member and a second linkage member;
   a second connecting arrangement for connecting and allowing pivotal displacement between distal end regions of the first linkage member and a third linkage member;
   a first step support connecting arrangement for connecting the first linkage member and a fourth linkage member inward of the second connecting arrangement and for providing a first stepping formation for a user;
   a third connecting arrangement for connecting and allowing pivotal displacement between the first linkage member and a fifth linkage member inward of the first step support connecting arrangement;
   a second step support connecting arrangement for connecting the first linkage member and a sixth linkage member between the third connecting arrangement and the first connecting arrangement and for providing a second stepping formation for a user;

wherein the step support connecting arrangements include shafts having first portions which are shaped to be received by and inhibit relative pivotal displacement between the first linkage member and the first stepping formation, and the first linkage member and the second stepping formation respectively, during the extension and retraction of the retractable ladder arrangement, and second portions shaped to be received by and allow pivotal displacement between the first linkage member and the fourth linkage member and the first linkage member and the sixth linkage member respectively; and wherein the first elongate linkage member has a first step support aperture and a second step support aperture defined therein for receiving the first portions of the shafts of the first and second step support connecting arrangements, respectively, therethrough.

2. A linkage assembly as claimed in claim 1 wherein the first elongate linkage member has first, second and third receiving apertures defined therein for receiving the first, second and third connecting arrangements, respectively.

3. A linkage assembly as claimed in claim 2 wherein the first, second and third receiving apertures are generally circular in cross-section.

4. A linkage assembly as claimed in claim 1 wherein the step support apertures are of any suitable non-circular cross-sectional shape selected from the group including oval, triangular, square, rectangular, pentagonal, hexagonal, heptagonal, octagonal, and any other suitable polygon shape.

5. A linkage assembly as claimed in claim 2 wherein the first, second and third connecting arrangements include additional shaft portions which are configured to be received complementally by the receiving apertures in the respective corresponding linkage members to allow relative pivotal displacement therebetween.

6. A linkage assembly as claimed in claim 5 wherein the connecting arrangements include bearing assemblies which are shaped and configured to be arranged between the additional shaft portions and receiving apertures to improve pivotal displacement between the respective linkages and shaft portions.

7. A linkage assembly as claimed in claim 5 wherein the connecting arrangements include bush assemblies which are shaped and configured to be arranged between the additional shaft portions receiving apertures to improve pivotal displacement between the respective linkages and shaft portions.

8. A linkage assembly as claimed claim 3 wherein the step support connecting arrangements includes bearings shaped and configured to be arranged between the second portions of the shafts and circular receiving apertures of the first linkage member to allow pivotal displacement therebetween.

9. A retractable ladder arrangement for a heavy-duty mining vehicle, which retractable ladder arrangement includes:
- a plurality of linkage assemblies as claimed in claim 1 which are connected in an end-to-end configuration;
- a primary displacement means including a motor and gearbox arrangement for displacing the linkage assemblies between a collapsed retracted condition and an extended condition;
- a coupling for coupling the linkage assemblies to the primary displacement means; and
- a controller for controlling the primary displacement means.

10. A retractable ladder arrangement as claimed in claim 9 wherein an auxiliary drive means in the form of a pressure vessel is coupled to the motor and gearbox arrangement for energizing and displacing the gearbox arrangement when the motor is inoperable.

11. A retractable ladder arrangement as claimed in claim 9 wherein the controller includes a remote-control means which is located in a position which permits a user access to the remote-control member from a ground surface.

* * * * *